United States Patent Office 3,579,493
Patented May 18, 1971

3,579,493
POLYMERIZATION OF ETHYLENE USING REDUCED GROUPS IV–B, V–B AND VI–B METAL SALTS AS THE POLYMERIZATION CATALYST
Karl Ziegler, 1 Kaiser Wilhelm Platz, Muelheim (Ruhr), Germany, and Heinz Breil, Muelheim (Ruhr), Germany; said Breil assignor to said Ziegler
No Drawing. Filed Aug. 9, 1955, Ser. No. 527,412
Claims priority, application Germany, Aug. 13, 1954, Z 4,371; Aug. 14, 1954, Z 4,374
Int. Cl. C08d 3/04, 3/08
U.S. Cl. 260—94.9     13 Claims

ABSTRACT OF THE DISCLOSURE

The polymerization of ethylene utlizing a catalyst formed by reducing a halide or acetylacetonate of a metal of Groups IV–B, V–B and VI–B of the periodic chart of the elements, including thorium and uranium, with an alkali metal or magnesium, or a mixture or an alloy thereof, or sodium-, lithium- or calcium hydride. The reduction agent may be in the form of a complex, as for example a complex compound with an organo boron compound. The catalyst may also be admixed with table salt.

---

This invention relates to new and useful improvements in the polymerization of ethylene.

In United States patent applications Ser. Nos. 469,059, filed Nov. 15, 1954 now Pat. No. 3,257,332; 482,412, filed Jan. 17, 1955 now abandoned; and 482,413, filed Jan. 17, 1955 now abandoned, a process for the polymerization of ethylene with the production of high-molecular polyethylenes, which may be used in the plastic industry, is described. The polymerization in according with the said applications, is effected by using catalysts which comprise mixtures of organic compounds of magnesium zinc, or preferably aluminum, with a compound of a metal of Group IV–B, V–B, or VI–B of the periodic system, including thorium and uranium. The aluminum compounds preferably comprise aluminum trialkyl, although in place of or together with the aluminum trialkyls there may be used aluminum compounds having the general formula RAlXY, in which R is hydrogen or a hydrocarbon radical, and X and Y are any other desired substituents, including hydrocarbon radicals and hydrogen. Of the compounds falling under this general formula, dialkyl and diaryl compounds are preferred, such as dialkyl and diaryl aluminum monohalides or corresponding organic compounds of magnesium and/or zinc.

Many of these catalysts are extremely active and with the use thereof it is possible to polymerize ethylene into high-molecular polyethylenes at low pressures of, for example, ethylene pressures or partial pressures of less than 1 atmosphere and at temperatures of less than 100° C.

One object of this invention is a polymerization catalyst which is free from the aluminum, magnesium, and zinc organic compounds and which may be used to polymerize ethylene into solid polyethylenes. This, and still further objects, will become apparent from the following description.

In accordance with the invention, it has been found that heavy metal compounds which have been reduced with the complete exclusion of oxygen, moisture, and active hydrogen, constitute extremely active polymerization catalysts which will actively polymerize ethylene to solid polyethylene suitable for use in the plastic industry.

The term "active hydrogen" as used herein, is intended to designate hydrogen atoms, as can be determined by the Zerevitinoff-Tschugaeff method. Examples of compounds which contain such active hydrogen atoms and must be excluded in the reduction in accordance with the invention, include alcohols, acids, and the like.

The starting heavy metal compounds, which are reduced in accordance with the invention with the complete exclusive of oxygen, moisture, and active hydrogen, produce the polymerization catalyst, are preferably salts, and, in particular, halides of metals of Groups IV–B, V–B, and VI–B of the periodic chart of elements, including thorium and uranium, i.e., titanium, zirconium, hafnium, vanadium, niobium, tantalum, chromium, molybdenum, tungsten, thorium and uranium. Titanium and zirconium halides have proven preferable.

The reduction of the above-mentioned heavy metal compounds in the absence of water, air, and active hydrogen, may be effected with reducing agents, such as metals of the first, second, and third groups of the periodic system, their alloys, and mixtures, hydrides, other than aluminum hydride, of alkali metals, of alkali earth metals, and of earth metals, and complex compounds of alkali metal hydrides. The complex compounds of the alkali metal hydrides may be with compounds of the general formula MeR'R''R''', in which Me is aluminum or boron, and R' and R'' and R''' are hydrocarbon radicals, alkoxy radicals, aryloxy radicals or hydrogen.

The hydrides which may be used for the reduction include hydrides of zinc and of the rare earth metals. For example, the reduction may be effected with alkali metals, such as lithium, potassium and sodium, even in the form of the molten potassium-sodium alloy. Further examples include borates, aryl and alkyl borates, lithium-aluminum hydride, and sodium boron hydride.

The alkali metals used as reducing agents, may also be in the form of compounds with boron triaryls or boron tribenzyl, as described in the book by E. Krause and A. V. Grosse, "Die Chemie der metallorganischen Verbindungen," Berlin, 1937, pages 207 to 208.

The reduction is preferably effected in the presence of inert solvents or suspension agents.

The above list of reducing agents is by no means exhaustive. The particular reducing agent used is not critical, and it is only critical that the reduction be effected with the exclusion of air and in the absence of water and materials carrying active hydrogen atoms.

The production of the catalyst should be effected at the lowest possible temperature, as, for example, at about room temperature, since the activity of the catalyst is thereby increased. As a rule, however, it is only possible to effect the reduction at these low temperatures by employing special measures as, for example, by effecting an intense mechanical comminution of the mixture during the reduction, as, for example, in a ball mill. The comminution of the reduction mixture may also be effected with the intimate admixture of other materials, such as common table salt, which are inert with respect to the reduction mixture, but make possible a finer comminution of the catalyst and frequently additionally prevent a too vigorous polymerization of the ethylene, which is particularly desirable in the case of mixtures containing aluminum, which is well known to cause a disadvantageous heating. For the same reason, organic compounds, such as ethers, tertiary amines, pyridine, and quinoline, which form complexes, but which are otherwise chemically inert, may suitably be added.

The polymerization proper is merely effected by contacting ethylene with the catalyst in a suitable vessel, as, for example, an autoclave. The catalyst is preferably suspended in an organic liquid, such as hexane.

The contacting with the ethylene may be effected at an ethylene pressure or partial pressure between about 0.2 and 100 atmospheres, and at temperatures between about −20 and +120° C., and preferably between about 40 and 100° C.

The following examples are given by way of illustration and not limitation:

EXAMPLE 1

9.35 grams molten potassium-sodium alloys, consisting of 7.8 grams potassium and 5.15 grams sodium, are intensively ground under nitrogen for 2 hours in a ball mill equipped for operation under nitrogen in the presence of 100 cc. of hexane and 19 grams of titanium tetrachloride. In this connection, first of all spontaneous heating occurs. The titanium tetrachloride disappears from the solution and passes over into a black, powdery mass, which can be easily suspended in hexane by shaking and can then be poured out of the ball mill (under nitrogen).

The suspension is added, under nitrogen, into an autoclave filled with nitrogen; 500 cc. of air-free, well-dried hexane are added, 30 to 50 atmospheres of ethylene are added, and the autoclave is stirred while heating to 60 to 100° C. The pressure in the autoclave drops during the course of a few hours. New ethylene is added under pressure a few times. There is formed in the autoclave a thick paste of the polyethylene suspended in hexane from which the polymer can easily be separated by filtration. The polymer at first still has a black color, but loses this color in air and upon treatment with methyl alcohol and hydrochloric acid while hot. The polymer is finally washed with methyl alcohol and preferably acetone, and dried. Instead of using hydrochloric acid, dilute nitric acid can be used to advantage.

EXAMPLE 2

A very fine suspension of lithium hydride in hexane is prepared by grinding 10 grams of lithium hydride in 100 cc. of hexane in a ball mill. A volume of this suspension containing 1.5 grams LiH is mixed with 50 cc. of dry hexane and 1.8 grams titanium tetrachloride, and the suspension is again ground in a ball mill for 8 hours under nitrogen. During the reaction a slight generation of hydrogen gas takes place. The polymerization catalyst obtained has exactly the same appearance as that obtained in accordance with Example 1. The polymerization itself takes place in the same way as in Example 1. The experiment also takes place in a similar manner if the lithium hydride is replaced by solid lithium aluminum hydride.

EXAMPLE 3

47 cc. of a suspension of sodium hydride in toluene with 58.8 milligrams of sodium hydride per cc. are mixed under nitrogen with 18 grams boron triethyl. The mixture is then heated to the boiling point. The sodium hydride passes practically completely into solution within two to three hours. Slight impurities of the sodium hydride readily deposit upon standing, so that the clear super-natant solution can be easily withdrawn. The solvent is distilled from the clear solution under nitrogen and in vacuum, whereupon there remains in the form of an oily distillation residue the boron triethyl sodium hydride already reported by Brown and Schlesinger, Journal of the American Chemical Society, 75, page 195 (1953). It was used for the following experiments:

(a) To 1.77 grams sodium triethyl-boron hydride, dissolved in 25 cc. of toluene, there were added 1.29 grams titanium tetrachloride in 25 cc. of toluene, a black voluminous precipitate depositing. The toluene and precipitate were then transferred, under nitrogen, into a small autoclave provided with an agitator and stirred intensively at 70° C. at a pressure of 5 to 20 atmospheres ethylene. The ethylene absorption was very vigorous. After cooling the autoclave and opening it, there was found a powdery, solid polyethylene suspended in the solvent.

(b) A similar catalyst is obtained if 1.6 grams zirconium tetrachloride are added to a toluene solution of 1.8 grams sodium triethyl boron hydride. The zirconium tetrachloride is preferably ground into a fine suspension with toluene in a ball mill before it is reacted with the complex sodium hydride compound.

EXAMPLE 4

To 17.8 grams diethyl phenyl borate (cf. E. Krause and A. V. Grosse, "Die Chemie der metallorganischen Verbindungen," page 215, Berlin, 1937), there are added under nitrogen in 100 cc. dry, air-free xylene 2.4 grams sodium hydride in the form of a suspension in xylene, which has previously been prepared in a ball mill. The mixture is heated under reflux until after some time the sodium hydride has completely dissolved, forming sodium phenyl diethoxy boron hydride $Na[C_6H_5B(OC_2H_5)_2H]$. The solution prepared in this manner gives, when anhyrous chromium chloride, uranium tetrachloride or thorium tetrachloride, as well as vanadium oxychloride, is added, polymerization catalysts for the production of high-molecular polyethylene. Instead of the metal chlorides, other salts can also be used in this connection, for example, the acetyl acetonates.

EXAMPLE 5

2.65 grams boron triphenyl sodium (prepared in accordance with the method of E. Krause and A. V. Grosse, "Die Chemie der metallorganischen Verbindungen," page 211, Berlin, 1937) are shaken in 50 cc. of toluene together with 1.8 grams titanium tetrachloride in a swinging mill vessel under nitrogen for 3 hours, a black colored suspension of the catalyst being obtained. This catalyst suspension can be used at a pressure of 10 to 20 atmospheres and a temperature of 50 to 70° C. for the polymerization of ethylene to form plastic-like products.

EXAMPLE 6

In a nitrogen atmosphere there is mixed in an ethereal soltuion of 3.4 grams of boron triphenyl sodium monoetherate (described in E. Krause and A. V. Grosse, "Die Chemie der metallorganischen Verbindungen," page 210, Berlin, 1937), 4.5 grams thorium acetylactonate in ether, the thorium being thereby reduced. The product formed can be used in the customary manner for the polymerization of ethylene into plastic-like products.

EXAMPLE 7

Electron metal containing 12% Al, 85% Mg, balance Zn, Cu, etc., was reduced to extremely fine shavings on a milling machine. 25 grams of the shavings were intensively ground in a ball mill of steel under nitrogen with 10 grams $TiCl_4$ and 100 cc. of Fischer-Tropsch diesel oil saturated by hydrogenation and distilled over sodium. After 24 hours, the $TiCl_4$ could no longer be detected in settled samples of the liquid ground material. The gray suspension obtained was mixed with 750 cc. of the same diesel oil and transferred under nitrogen into an ordinary laboratory agitator consisting of glass. Ethylene was thereupon introduced at about 40° C., while stirring, the ethylene being vigorously absorbed and flakes of polyethylene separating. After 2 hours, the experiment was interrupted. The solid constituents were removed by suction filtering and thereupon treated first of all with acetone and then with methyl-alcoholic hydrochloric acid. There were obtained 100 grams of solid, pure white polyethylene.

Similar results are obtained with analogous experiments upon replacing the electron metal with magnesium, aluminum shot, aluminum shot plus table salt (first of all strongly dried and pulverized) and magnesium-aluminum alloys, particularly with those which, like $Mg_3Al_2$, are characterized by great brittleness and therefore can be ground particularly well.

In the case of practically all catalysts which can be obtained in this manner, the polymerization commences even at an ethylene pressure of 1 atmosphere. If the ethylene is diluted with inert gases, such as nitrogen, ethane, hydrogen, or propane, the formation of polyethylene can be noted even up to an ethylene partial pressure of 0.1 atmospheres, although more slowly than in Example 1. In order to accelerate the polymerization, it is, however, advisable to increase the ethylene pressure moderately above normal pressure. A very convenient pressure region which can be easily controlled industrially is at about 10 atmospheres. At still higher pressures, the polymerization can take place extremely vigorously, and strong spontaneous increases in temperature can occur, which may finally result in decomposition with the formation of carbon. If, therefore, it is desired to employ pressures higher than about 10 atmospheres, it is best to work in the presence of substantially more solvents than in the above example.

EXAMPLE 8

Technical, so-called "mixed metal" (mixture of different rare earth metals) is first of all made into shavings which are as fine as possible in a thickly liquid mineral oil by means of a suitable boring or milling machine. The mineral oil is then displaced by benzene by dilutting several times with pure, dry thiophene-free benzene and repeated pouring off of the liquid over the shavings, 10 grams of shavings, 100 cc. of benzene, and 5 grams of zirconium tetraiodide are introduced into a steel ball mill sleeve and the mixture is ground very thoroughly and for a long time at a temperature just below the boiling point of benzene. The zirconium iodide which is only slightly soluble in benzene, reacts slowly with the mixed metal. The suspension, which gradually assumes a dark color during the grinding, polymerizes very vigorously after a grinding period of 3 days at 70° C. and 50 atmospheres ethylene.

EXAMPLE 9

19 grams of titanium tetrachloride in 200 cc. of decahydronaphthalene (boiled over sodium and distilled beneath nitrogen) are reacted with 10 grams calcium hydride at 150° C. in a steel ball mill in the manner described in Examples 7 and 8. Hydrogen escapes during the reaction. The grayish black suspension finally obtained acts on ethylene in a manner similar to the catalysts described in Examples 1 and 2.

We claim:

1. In the process for the polymerization of ethylene, the improvement which comprises contacting ethylene with a catalyst essentially consisting of a member selected from the group consisting of vanadium oxychloride, acetylacetonates of a metal of Groups IV-B, V-B and VI-B of the periodic chart of elements, including thorium and uranium, and halides of said metals which solely contain the halogen and metal atoms, which has been reduced in a media substantially free of oxygen, moisture and active hydrogen-containing compounds using a reducing agent selected from the group consisting of sodium hydride, lithium hydride and complexes of alkali metal hydrides with a boron compound of the formula BR'R''R''' where R', R'' and R''' are hydrocarbon, alkoxy, aryloxy or hydrogen.

2. Improvement according to claim 1, in which said first mentioned group member is a titanium halide.

3. Improvement according to claim 1, in which said first mentioned group member is a zirconium halide.

4. Improvement according to claim 1, in which said contacting is effected within ethylene pressure between about 0.2 and 100 atmospheres.

5. Improvement according to claim 4, in which said contacting is effected at a temperature between about $-20$ and $+120°$ C.

6. Improvement according to claim 5 in which said contacting is effected at a temperature between about 40 and 100° C.

7. Improvement according to claim 1, in which said catalyst is suspended in an organic liquid.

8. Improvement according to claim 7 in which said organic liquid is a hydrocarbon.

9. Improvement according to claim 1 in which said first-mentioned group member has been reduced in the presence of a complex-forming organic compound selected from the group consisting of ethers, tertiary amines, pyridine and quinoline.

10. Improvement according to claim 1 in which said first-mentioned group member has been reduced in the presence of table salt.

11. In the process for the polymerization of ethylene, the improvement which comprises contacting ethylene with a catalyst essentially consisting of a member selected from the group consisting of vanadium oxychloride, acetylacetonates of a metal selected from groups IV-B, V-B and VI-B of the periodic chart of the elements, including thorium and uranium, and halides of said metals which solely contain the halogen and metal atoms, which has been reduced in a media substantially free of oxygen, moisture and active hydrogen-containing compounds using a reducing agent selected from the group consisting of a complex compound of a member selected from the group consisting of alkali metal hydrides with an organo boron compound of the formula BR'R''R''' in which R', R'' and R''' are hydrocarbon, alkoxy, aryloxy or hydrogen.

12. Process according to claim 11 in which said first-mentioned group member is a zirconium halide.

13. In the process for the polymerization of ethylene, the improvement which comprises contacting ethylene with a catalyst essentially consisting of a metal selected from the group consisting of vanadium oxychloride, acetylacetonates of a metal selected from groups IV-B, V-B and VI-B of the periodic chart of the elements, including thorium and uranium, and halides of said metals which solely contain the halogen and metal atoms, which has been reduced in the presence of table salt in a media substantially free of oxygen, moisture and active hydrogen-containing compounds using a reducing agent selected from the group consisting of aluminum, magnesium, alkali metals, mixtures and alloys of said metals, alkali metal hydrides and calcium hydrides.

References Cited

UNITED STATES PATENTS

| | | | |
|---|---|---|---|
| 2,567,109 | 9/1951 | Howard | 260—80 |
| 2,721,189 | 10/1955 | Anderson | 260—93.7 |
| 2,691,647 | 10/1954 | Field et al. | 260—94.9 |
| 2,822,357 | 2/1958 | Brebner et al. | 260—94.9 |
| 2,726,231 | 12/1955 | Field et al. | 260—94.9 |

OTHER REFERENCES

Ruff et al.: "Zietschrift fur Anoganishe Chemie," Band 128, Feb. 23, 1923, pp. 81–116, 84, 85, 98 and 103 only needed.

JOSEPH L. SCHOFER, Primary Examiner

E. J. SMITH, Assistant Examiner

UNITED STATES PATENT OFFICE
CERTIFICATE OF CORRECTION

Patent No. 3,579,493　　　　　　　　　　Dated May 18, 1971

Inventor(s) KARL ZIEGLER and HEINZ BREIL

It is certified that error appears in the above-identified patent and that said Letters Patent are hereby corrected as shown below:

Col. 2, line 5, "exclusive" should be --exclusion--; col. 3, line 5, "5.15" should be --1.55--

Signed and sealed this 13th day of June 1972.

(SEAL)
Attest:

EDWARD M. FLETCHER, JR.　　　　　　　ROBERT GOTTSCHALK
Attesting Officer　　　　　　　　　　Commissioner of Patents